3,021,725
RIGHT ANGLE DRIVE STEERABLE PROPELLER
Arthur J. R. Schneider, San Marino, Calif., assignor to Waste King Corporation, Los Angeles, Calif., a corporation of California
Filed June 2, 1958, Ser. No. 739,297
1 Claim. (Cl. 74—665)

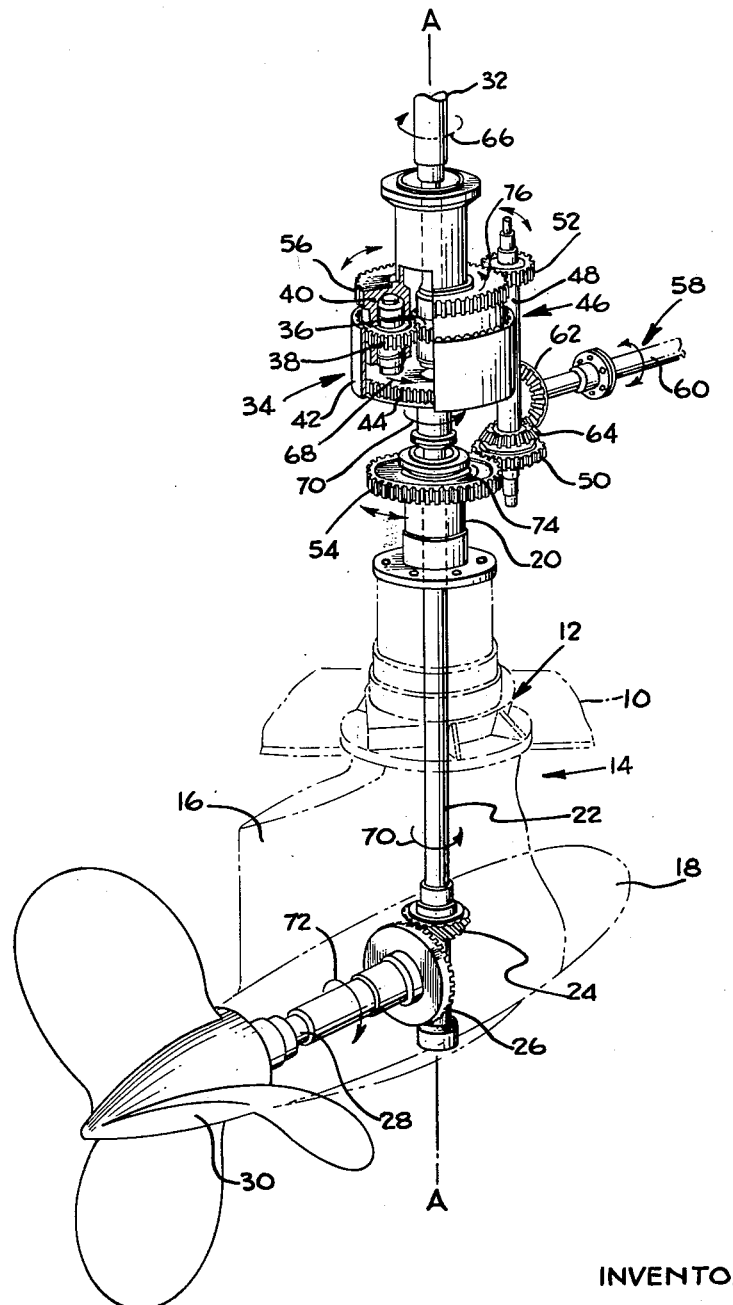

The present invention relates in general to balanced torque systems and, since the invention is particularly applicable to a steerable propeller with a right angle drive involving a generally horizontal propeller shaft geared to a generally vertical drive shaft, it will be considered in such connection herein for convenience of illustration with the understanding that other applications of the invention are possible also.

A steerable propeller with a right angle drive of the foregoing nature includes a steerable structure which is pivotable about a generally vertical axis and which carries a generally horizontal shaft having one or more propellers thereon, the propeller shaft being geared to a generally vertical shaft the axis of rotation of which coincides with the pivot axis of the steerable structure. In order to steer a hull equipped with such an installation, it is merely necessary to pivot the steerable structure in the proper direction about its generally vertical pivot axis.

The right angle propeller drive incorporated in the steerable structure produces a reaction torque which tends to cause the steerable structure to gyrate about the axis of the generally vertical drive shaft. With low torque installations, the reaction torque of the steerable structure is no particular problem and can readily be opposed by the helmsman. However, in high torque drives transmitting several hundred horsepower, for example, the helmsman cannot cope with the reaction torque of the steerable assembly and means must be provided for overcoming the reaction torque. It has been proposed to utilize a power steering system for this purpose, but any power steering system which is capable of overcoming a high reaction torque is a complicated, highly loaded system, which is obviously disadvantageous.

A primary object of the invention is to provide a steerable structure, having a right angle propeller drive incorporating a single generally vertical drive shaft, wherein the reaction torque of the steerable structure is neutralized by a counterbalancing means to which the reaction torque of the steerable structure and a compensating reaction torque are applied in torque opposing relation.

More particularly, an important object of the invention is to provide a counterbalancing means connecting the steerable structure, which constitutes a first rotatable torque reaction means, and a second rotatable torque reaction means, which is connected to the generally vertical drive shaft, in torque opposing relation so that the reaction torque of the second torque reaction means cancels the reaction torque of the first torque reaction means, or steerable structure.

Another object is to provide an installation wherein the second or compensating torque reaction means mentioned comprises a rotatable torque reaction member forming part of a rotation transmitting means coupling the generally vertical drive shaft, sometimes referred to herein as an output shaft, to an input shaft driven by a suitable power plant, which may be a turbine, for example.

A further object is to provide a rotation transmitting means comprising a planetary transmission, the rotatable torque reaction member mentioned being the normally stationary member on which the planet gears of the planetary transmission are mounted. It will be understood, however, that the invention is not limited to making the rotatable torque reaction member a part of a planetary transmission, since it may be a normally stationary part of a transmission of any of several other types.

Another object of the invention is to pivot the steerable structure with a steering means which is connected to the counterbalancing means coupling the steerable structure and the torque reaction member together. More particularly, an object in this connection is to provide a counterbalancing means which is rotatable relative to and which is capable of rotating the steerable structure and the torque reaction member, the steering means being adapted to rotate the rotatable counterbalancing means.

A further object is to provide an installation wherein the reaction torque of the steerable structure and the reaction torque of the torque reaction member are opposed in direction, the counterbalancing means being a simple jackshaft geared to the steerable structure and the torque reaction member with gear ratios such as to cause the two reaction torques to exactly cancel each other. With this construction, the steering means may conveniently take the form of a steering shaft connected to the jackshaft mentioned, as by being geared thereto.

With the foregoing construction, the reaction torque of the steerable structure is exactly balanced by the reaction torque of the torque reaction member provided by the transmission. Consequently, the input torque demanded of the helmsman by the steering shaft for steering purposes is equal to zero, except for the torque due to friction and the torque due to hydrodynamic action on the steerable structure. Also, since only a single generally vertical drive or output shaft is required, the frontal area of the steerable structure is minimized to minimize hydrodynamic resistance, which is an important feature.

The foregoing objects, advantages, features and results of the present invention, together with various other objects, advantages, features and results thereof which will be evident to those skilled in this art in the light of the present disclosure, may be attained with the exemplary embodiment of the invention described in detail hereinafter and illustrated in the accompanying drawing, the single figure of which is a semidiagrammatic perspective view, partially in section and partially in elevation, of a balanced torque, steerable, right angle drive propeller of the invention.

In the drawing, the numeral 10 designates a hull bottom carrying bearing means 12 for a steerable structure 14 pivotable about a generally vertical axis A—A. The steerable structure includes a stabilizing fin 16 providing the steerable structure with a center of pressure aft of the axis A—A for stability. The fin 16 is preferably a hydrofoil and terminates at its lower end in a streamlined nacelle 18. The steerable structure 14 also includes a hollow shaft 20 above the hull bottom 10, such hollow shaft being pivotable about the axis A—A with the fin 16 and the nacelle 18.

Rotatable relative to the steerable structure 14 about the axis A—A is a drive shaft or output shaft 22 carrying a bevel gear 24 meshed with a bevel gear 26 on a generally horizontal propeller shaft 28 within and coaxial with the nacelle 18. The propeller shaft 28 carries a propeller 30 at the rear end of the nacelle 18. If desired, the nacelle 18 may be provided with counterrotating propellers at opposite ends thereof in an obvious manner.

Coaxial with the drive shaft 22 is an input shaft 32 which may be driven by any suitable power source, such as a turbine, not shown. The input shaft 32 drives the shaft 22 through a planetary transmission 34 which comprises a sun gear 36 on the input shaft, a plurality of planet gears 38 rotatably mounted on a torque reaction member 40 which is rotatable about the axis A—A, and a ring gear 42 connected to the shaft 22. As will be apparent, the sun gear is meshed with the planet gears and the planet gears are meshed with the ring gear. In order to connect the ring gear 42 to the drive shaft 22, the ring gear is splined to a member 44 connected to the upper end of the drive shaft 22.

The invention provides a counterbalancing means 46 which connects the steerable structure 14 and the torque reaction member 40 together in torque opposing relation so that the reaction torque of the steerable structure is opposed by the reaction torque of the member 40. Considering the counterbalancing means 46, it includes a rotatable jackshaft 48 having thereon gears 50 and 52 respectively meshed with gears 54 and 56 on the steerable structure 14 and the torque reaction member 40. The ratios between the gears 50 and 54 and the gears 52 and 56 are such that the reaction torques of the steerable structure 14 and the torque reaction member 40 are exactly balanced.

The invention also provides a steering means 58 comprising a steering shaft 60 having thereon a bevel gear 62 meshed with a bevel gear 64 on the jackshaft 48. As will be apparent, by rotating the steering shaft 60 in one direction or the other, the steerable structure 14 is correspondingly pivoted through the gears 62 and 64, the jackshaft 48, and the gears 50 and 54. Such pivoting of the steerable structure 14 results in corresponding pivoting of the torque reaction member 40, the extent to which the torque reaction member pivots depending upon the ratios between the gears 50 and 54 and the gears 52 and 56.

Considering the over-all operation of the invention, if the input shaft 32 is driven in the direction of the arrow 66, the member 44 is driven in the direction of the arrow 68 to rotate the drive shaft 22 in the same direction, as indicated by the arrows 70. The propeller shaft 28 is driven in the direction of the arrow 72 to rotate the propeller 30 in the same direction.

Under the foregoing conditions, the reaction torque of the steerable structure 14 is in the direction of the arrow 74 and the reaction torque of the member 40 is in the opposite direction, as indicated by the arrow 76. Since the two reaction torques are in opposite directions, they are applied to the jackshaft 48 in opposing relation by the gears 50 and 54 and the gears 52 and 56. If the two reaction torques are of the same magnitude, the ratio between the gears 50 and 54 and the ratio between the gears 52 and 56 are equal to obtain precise balancing of the torques. If the two reaction torques are unequal, precise torque balancing may be obtained by appropriately relating the ratio between the gears 50 and 54 and the ratio between the gears 52 and 56.

For steering purposes, it is merely necessary for the helmsman to rotate the steering shaft 60 in one direction or the other to swing the steerable structure 14 correspondingly. In doing this, it is completely unnecessary for the helmsman to overcome any of the reaction torque of the steerable structure 14, the helmsman having to overcome only torque due to friction and torque due to hydrodynamic action on the steerable structure.

It will be understood that the drive and propeller shafts 22 and 28 need not be at a right angle to each other and that the drive shaft need not be generally vertical. Also, the counterbalancing means 46 may be at any angle to the drive shaft 22.

Although an exemplary embodiment of the invention has been disclosed herein for illustrative purposes, it will be understood that various changes, modifications and substitutions may be incorporated in such embodiment without departing from the spirit of the invention as defined by the claim which follows.

I claim:

In combination: an input shaft; an output shaft coaxial with said input shaft; a rotatable structure pivotable about the axis of said input and output shafts; rotation transmitting means coupling said input shaft and said output shaft together and providing a rotatable torque reaction member, said rotation transmitting means comprising a planetary transmission having a sun gear on said input shaft, planet gears meshed with said sun gear and rotatably mounted on said torque reaction member, and a ring gear meshed with said planet gears and connected to said output shaft; a reaction gear on said rotatable structure; a reaction gear on said torque reaction member; a counterbalance shaft disposed parallel to said axis and including gears meshed with said reaction gears on said rotatable structure and said torque reaction member, respectively, for connecting said rotatable structure and said torque reaction member in torque opposing relationship; and control means comprising a control shaft geared to said counterbalance shaft so as to rotate said gears of said counterbalance shaft.

References Cited in the file of this patent

UNITED STATES PATENTS

| | | |
|---|---|---|
| 261,757 | Petterson | July 25, 1882 |
| 348,411 | Pattison | Sept. 30, 1886 |
| 2,349,744 | Morgan | May 23, 1944 |
| 2,372,226 | Robin et al. | Mar. 27, 1945 |

FOREIGN PATENTS

| | | |
|---|---|---|
| 214,459 | Switzerland | Apr. 30, 1941 |
| 1,012,843 | Germany | July 25, 1957 |